(12) United States Patent
Kain

(10) Patent No.: US 6,491,348 B1
(45) Date of Patent: *Dec. 10, 2002

(54) CHILD VEHICLE SEAT WITH CHILD-RESTRAINT HARNESS ADJUSTMENT MECHANISM

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 96 days.

This patent is subject to a terminal disclaimer.

(21) Appl. No.: 09/628,459

(22) Filed: Jul. 31, 2000

(51) Int. Cl.⁷ .................................................. B60N 2/28
(52) U.S. Cl. ..................... 297/484; 297/250.1
(58) Field of Search ............................. 297/250.1, 410, 297/468, 483, 484

(56) References Cited

U.S. PATENT DOCUMENTS

| | | | |
|---|---|---|---|
| 4,040,664 A | * 8/1977 | Tanaka et al. | 297/484 |
| 4,047,755 A | 9/1977 | McDonald et al. | |
| 4,376,551 A | 3/1983 | Cone | |
| 4,632,456 A | 12/1986 | Kassai | |
| 4,709,960 A | 12/1987 | Launes | |
| 4,790,601 A | * 12/1988 | Burleigh et al. | 297/484 |
| 4,854,639 A | * 8/1989 | Burleigh et al. | 297/250.1 |
| 4,858,997 A | 8/1989 | Shubin | |
| 5,082,325 A | 1/1992 | Sedlack | |
| 5,181,761 A | 1/1993 | Meeker | |
| 5,335,964 A | 8/1994 | Sedlack et al. | |
| 5,344,213 A | 9/1994 | Koyanagi | |
| 5,468,046 A | * 11/1995 | Weber et al. | 297/484 |
| 5,580,126 A | 12/1996 | Sedlack | |
| 5,775,772 A | * 7/1998 | Lefranc | 297/250.1 |
| 6,030,047 A | 2/2000 | Kain | 297/484 |

FOREIGN PATENT DOCUMENTS

GB    2 282 32 1    4/1995

* cited by examiner

Primary Examiner—Peter R. Brown
(74) Attorney, Agent, or Firm—Barnes & Thornburg (57) ABSTRACT

A child-restraint seat is provided including a seat shell adapted to be coupled to a vehicle seat by a seat anchor coupled to the vehicle, a child-restraint harness coupled to the seat shell, a harness-control panel for adjusting the height of the harness, and a panel height adjustment mechanism coupled to the harness-control panel. The seat shell includes a bottom seat portion and a back support portion. The harness-control panel is mounted on the seat shell for up and down movement relative to the seat shell to raise and lower the shoulder belt portions of the child-restraint harness with respect to the bottom seat portion to harness small-sized children and large-sized children in a restrained position in the seat shell. The harness-control panel includes a belt-receiving opening for receiving a shoulder belt portion of the child-restraint harness. The panel-height adjustment mechanism of the seat includes a handle bar having a first arm coupled to the harness-control panel and a second arm spaced-apart from the first arm and also coupled to the harness-control panel, and a belt support bar movably coupled to the first and second arms of the handle bar to engage and disengage a panel height locator on the seat shell to secure the harness-control panel at a desired height.

47 Claims, 7 Drawing Sheets

CHILD VEHICLE SEAT WITH CHILD-RESTRAINT HARNESS ADJUSTMENT MECHANISM

BACKGROUND AND SUMMARY OF THE INVENTION

The present invention relates to seats for use by children in vehicles and, particularly, to seats having child-restraining harness belts and to seats configured to seat older children in a restrained fashion using adult vehicle lap and shoulder belts. More particularly, the present invention relates to a child vehicle seat with a child-restraint harness adjustment mechanism and to a child vehicle seat with a headrest adjustment mechanism.

Many child car seats are formed to include several sets of shoulder belt-receiving apertures in a back wall of the car seat so that the car seat can be adapted by a user to restrain children of different sizes. To accommodate an infant, the two shoulder belts are uncoupled from other portions of the car seat harness, passed through a lowest pair of shoulder belt-receiving apertures formed in the back wall of the car seat, and then recoupled to the car seat harness.

As the infant grows, the caregiver must repeat the belt installation procedure described above using other higher sets of belt-receiving apertures formed in a higher portion of the back wall of the car seat to enlarge the child car seat harness to accommodate the growing child. U.S. Pat. No. 6,030,047 to James M. Kain, which patent is hereby incorporated by reference herein, discloses a car seat that is adaptable to hold infants, toddlers, and juveniles and, in particular, is adaptable to adjust the size of the child-restraint harness quickly and easily to accommodate children of various sizes in the child car seat.

In accordance with the present invention, a child-restraint seat includes a seat shell adapted to seat a child, a child-restraint harness coupled to the seat shell, and a harness-control panel formed to include a belt-receiving opening receiving a shoulder belt portion of the child-restraint harness. The harness-control panel is mounted on the seat shell for up and down movement relative to the seat to raise and lower the shoulder belt portion of the child-restraint harness with respect to a bottom seat portion of the seat so as to harness both small-sized and large-sized children properly in a restrained position in the seat.

The child-restraint seat further includes a panel-height adjustment mechanism coupled to the harness-control panel and provided to move the harness-control panel up and down relative to the seat shell. The panel-height adjustment mechanism includes a handle bar, a belt support bar coupled to the handle bar, and a first and second spring each coupled to the belt support bar and the handle bar. The handle bar includes a first arm coupled to the harness control panel, a second arm spaced-apart from the first arm and coupled to the harness-control panel, and a grip member coupled to and positioned to lie between the first and second arms of the handle bar. The belt support bar is coupled to and positioned to lie between the first and second arms of the handle bar. The belt support bar is also movable in a generally horizontal direction relative to the harness-control panel.

In preferred embodiments, the harness-control panel includes a back plate having a front side and a back side which is positioned to lie adjacent the seat shell. The harness-control panel further includes two posts coupled to the back side of the back plate. Each post forms a cavity for receiving one of the first and second arms of the handle bar therein. Each of the first and second arms, therefore, is positioned to pass through one of two guide slots formed in a back support portion of the seat shell to guide the up and down movement of the harness-control panel and panel-height adjustment mechanism relative to the seat shell.

A middle portion of the first shoulder belt passes through a first slot in the back panel and a matching first channel in the back support portion and connects to the height-adjustment apparatus. Likewise, a middle portion of the second shoulder belt passes through a second slot in the back panel and a matching second channel in the back support portion and connects to the height-adjustment apparatus. By operating the panel height-adjustment mechanism it is possible at the option of a caregiver either to raise the harness-control panel higher above the bottom seat portion, thereby raising the shoulder belts higher so as to accommodate and harness a larger-sized child or to lower the harness-control panel closer to the bottom seat portion, thereby moving the shoulder belts lower so as to accommodate and harness a smaller-sized child.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIGS. 7–9 show a sequence of steps in which the belt support bar is moved generally horizontally and the panel-height adjustment mechanism is operated to raise the harness-control panel from a lowest position (in which the horizontal belt support bar engages a first slot formed in the vertical bar anchor member) to a next highest position (in which the horizontal belt support bar engages a second slot formed in the vertical bar anchor member);

DETAILED DESCRIPTION OF THE DRAWINGS

Figures 1, 2:
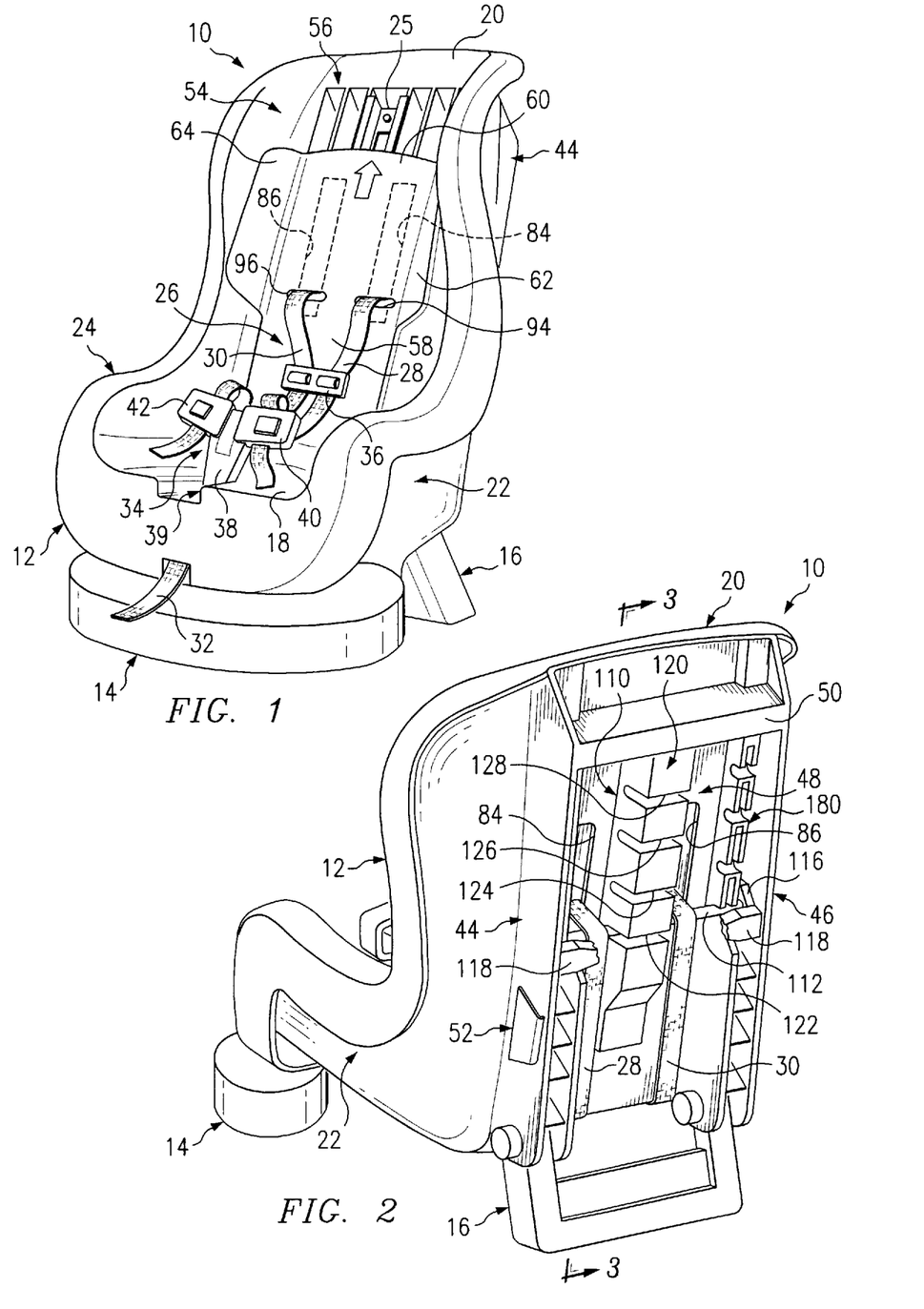
FIG. 1 is a front perspective view of a seat including a seat shell, a base, a child-restraint harness coupled to the seat shell, and a harness-control panel movable up and down relative to the seat shell (in a position behind a child seated in the seat shell) to adjust the height of shoulder belts included in the child-restraint harness relative to a bottom seat portion of the seat shell to adapt the seat for use by both small-sized and large-sized children.
FIG. 2 is a rear perspective view of the seat of FIG. 1 showing two shoulder belts of the child-restraint harness extending along a back side of the seat shell and engaging a horizontal belt support bar and a handle bar (shown with portions broken away) included in a panel-height adjustment mechanism coupled to the harness-control panel through guide slots formed in the seat shell and showing a slotted center vertical support bar anchor member coupled to the back side of the seat shell and included in the panel-height adjustment mechanism.
Figure 3:
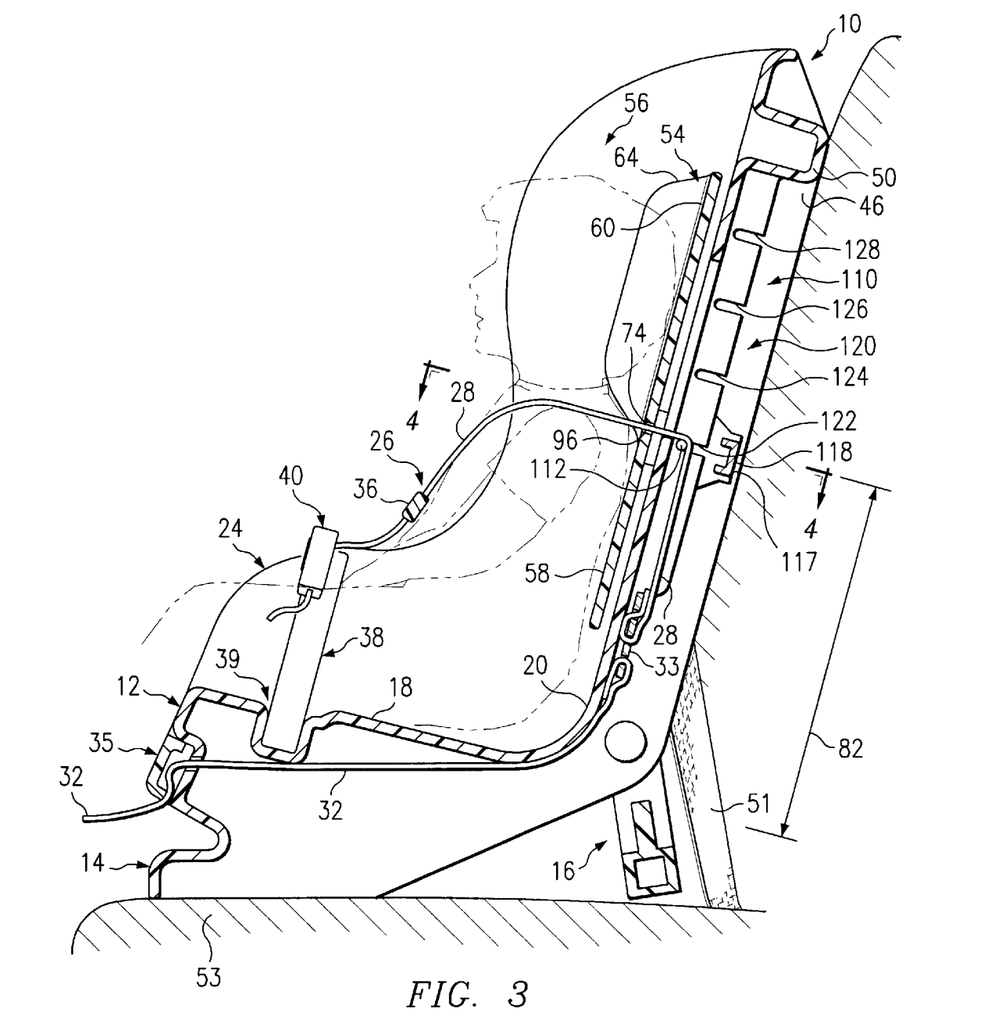
FIG. 3 is a vertical sectional view of the seat of FIGS. 1 and 2 taken along line 3—3 of FIG. 2 showing the child-restraint harness coupled to the seat shell and panel-height adjustment mechanism to restrain a child (shown in phantom) seated in the seat and showing the harness-control panel positioned to lie in a lowest one of four available positions (wit the shoulder belts passing therethrough) and retained in such a position by the panel-height adjustment mechanism.

A child-restraint seat 10 is shown in FIGS. 1 and 2 and is configured to be used on a vehicle seat 53, as shown in FIG. 3. Child-restraint seat 10 includes a harness 26 and a harness-control panel 54 designed to accommodate younger, smaller children and older, larger children and arranged to lie between the seat 10 and a child seated on seat 10. Belt support bar 112 and handle bar 118 are operated manually by a user to move harness-control panel 54 up and down relative to child-restraint seat 10, as shown, for example, in FIGS. 7–9, in order to accommodate children of various sizes.

Child-restraint seat 10 further includes a seat shell 12, a base 14, and a pivotable support leg 16 as shown in FIGS. 1–3. Seat shell 12 and base 14 are molded out of plastics material to form a child-supporting seat. Child-restraint seat 10 can be converted for use as a forward-facing seat or a rearward-facing seat by movement of pivotable support leg 16 relative to base 14. Although seat shell 12 is shown as a one-piece molded body in the illustrated embodiment, it is within the scope of this disclosure to use a multiple-piece body as well.

Seat shell 12 includes a bottom seat portion 18 adapted to support a child's bottom and upper legs and a back support portion 20 positioned to lie at an angle to bottom seat portion 18, as shown in FIG. 1. As shown, for example, in FIGS. 5, 10, 12, and 15, harness-control panel 54 is movable up and down relative to the front face of back support portion 20 to accommodate larger as well as smaller children on seat 10.

Figure 4:
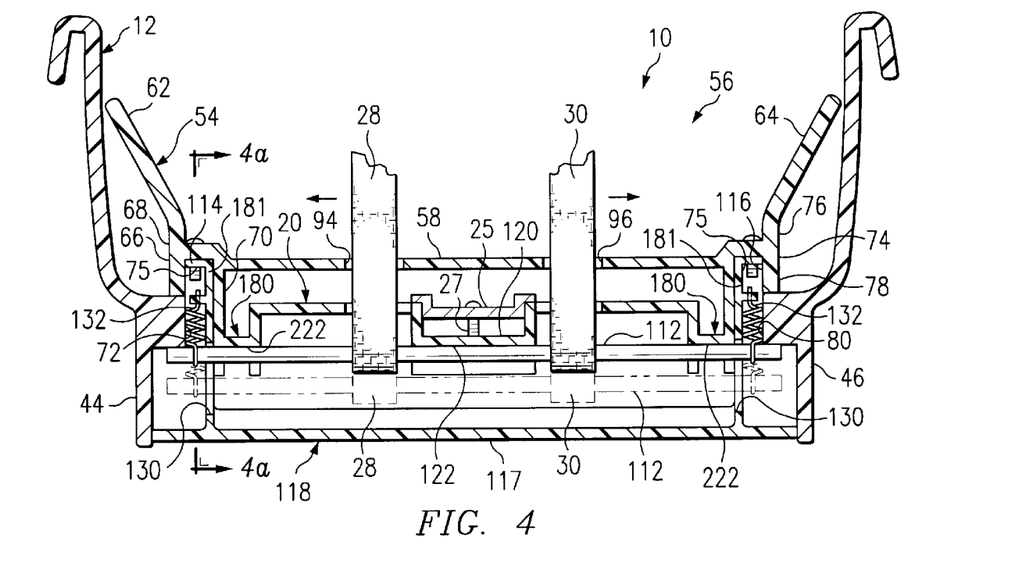
FIG. 4 is a transverse sectional view taken along line 4—4 of FIG. 3 showing a back support portion of the seat shell positioned to lie between the movable harness-control panel and the panel-height adjustment mechanism and showing the two shoulder belts extending through openings formed in the harness-control panel and back support portion to engage the spring-biased horizontal belt support bar included in the panel-height adjustment mechanism and to lie on opposite sides of the center vertical support bar anchor member and a bar release handle.

First and second side wall portions 22, 24 are provided in seat shell 12 for preventing lateral movement of the child in child-restraint seat 10 and lie on opposite sides of bottom seat portion 18 as shown in FIG. 1. A metal reinforcing rib 25 is coupled to a front side of back support portion 20 as shown in FIG. 4. Rib 25 is coupled to back support portion by screw 27 and extends vertically along the height of back support portion 20 to provide added support. A cushion or seat cover (not shown) can cover bottom and/or back support portions 18, 20 for added comfort and/or appearance.

A harness 26 is provided to restrain a child's movement relative to seat shell 12 and includes shoulder belts 28, 30, a lower belt 32, and a buckle unit 34, as shown in FIGS. 1 and 3. A harness retainer 36 is used to hold shoulder belts 28, 30 together as shown in FIG. 1. One end of lower belt 32 is coupled to shoulder belts 28, 30 by a junction member 33 and another end of lower belt 32 is coupled to seat shell 12 by a belt adjustment mechanism 35 as shown in FIG. 3. Buckle unit 34 includes a frame 38 selectively coupled to a connector 39 on bottom seat portion 18, a buckle 40 coupling first shoulder belt 28 to frame 38, and a buckle 42 coupling second shoulder belt 30 to frame 38. Child-restraint seat 10 can be adapted to receive other styles of harnesses (not shown) and a combination of a harness and a movable barrier shield (not shown).

As shown, for example, in FIG. 2, seat shell 12 further includes first and second vertical back ribs 44, 46 appended to back support portion 20 and positioned to lie in spaced-apart relation to one another to define a space 48 therebetween. Seat shell 12 also includes a horizontal back rib 50 appended to back support portion 20 and positioned to interconnect upper ends of vertical back ribs 44, 46 and define an upper boundary of space 48. Each vertical back rib 44, 46 is formed to include a vehicle belt channel 52 for receiving a vehicle lap belt 51 when child-restraint seat 10 is restrained on a vehicle seat 53 in a forward-facing position as shown, for example, in FIG. 3.

Harness-control panel 54 is positioned to lie in a child-receiving space 56 defined in a front portion of child-restraint seat 10 and is mounted for up-and-down movement relative to bottom seat portion 18 in child-restraint seat 10 as shown best in FIGS. 1, 4, 5, 7–10, 12, 14, and 15. Up-and-down movement of harness-control panel 54 functions to raise and lower the "height" of shoulder belts 28, 30 above bottom seat portion 18 to adapt child-restraint seat 10 to accommodate young, small-sized children or older, larger-sized children.

Harness-control panel 54 includes a back plate 58 formed to include shoulder belt-receiving slots 94, 96 and a headrest 60 provided in an upper portion of back plate 58 above slots 94, 96. Harness-control panel 54 also includes first and second wing members 62, 64 coupled to opposite edges of back plate 58 and positioned to lie in spaced-apart relation to one another. Each wing member 62, 64 is oriented to lie at an angle relative to back plate 58 as shown, for example, in FIGS. 1 and 4. Up-and-down movement of harness-control panel 54 also functions to raise and lower the height of headrest 60 above bottom seat portion 18 to adapt child-restraint seat 10 to accommodate young, small-sized children or older, larger-sized children. As shown, for example, in FIGS. 5, 10, and 12, shoulder belts 28, 30 and headrest 60 move up and down together relative to seat shell 12 to assure proper shoulder belt fit for a child seated in child-restraint seat 10.

As shown best in FIGS. 3 and 4, harness-control panel 54 includes a first support arm 66 having a front end 68 coupled to back plate 58 and a rear end 70. Harness-control panel 54 also includes a second support arm 74 having a front end 76 coupled to back plate and second wing member 64 and a rear end 78. Each of the first and second support arms 66, 74 is further formed to define a cavity 75 for receiving a portion of handle bar 118 therein.

Back support portion 20 of seat shell 12 and back plate 58 of movable harness-control panel 54 are configured to cooperate to set the nominal height 82 (see FIG. 3) of first and second shoulder belts 28, 30 above bottom seat portion 18 of seat shell 12. A caregiver can raise and lower harness-control panel 54 easily to change the height of first and second shoulder belts 28, 30 by operating a panel-height adjustment mechanism 110 of seat 10 which includes belt support bar 112 and handle bar 118, which, as mentioned above, is coupled to harness-control panel 54.

Back support portion 20 is formed to include two vertical channels 84, 86 shown, for example, in FIGS. 1 (phantom), 2, and 2a. The channels 84, 86 are aligned in spaced-apart relation to lie "behind" back plate 58 of harness-control panel 54 so that first shoulder belt 28 can pass through first channel 84 and second shoulder belt 30 can pass through second channel 86. As mentioned before, harness-control panel 54 is formed to include a pair of spaced-apart horizontally extending, elongated, belt-receiving slots 94, 96 as shown, for example, in FIGS. 1, 2a, and 5.

First slot 94 is sized to receive a portion of first shoulder belt 28 and to allow the portion of first shoulder belt 28 also to pass through first channel 84. First channel 84, formed in back support portion 20, is arranged to lie in communication with belt-receiving slot 94 formed in harness-control panel 54 to enable movement of a portion of first shoulder belt 28 in slot 94 and first channel 84 during up and down movement of harness-control plate 54 relative to seat shell 12.

Second slot 96 is sized to receive a portion of second shoulder belt 30 and allow the portion of second shoulder belt 30 also to pass through second channel 86. Second channel 86, formed in back support portion 20, is arranged to lie in communication with belt-receiving slot 96 formed in harness-control panel 54 to enable movement of a portion of second shoulder belt 30 in slot 96 and second channel 86 during up and down movement of harness-control plate 54 relative to seat shell 12.

The height of harness-control panel 54 above bottom seat portion 18 determines the nominal height 82 (i.e. seat shell 12 entry point) of the first and second shoulder belts 28, 30. Child-restraint seat 10 can be adjusted to accommodate young, small-sized children by moving harness-control panel 54 to its lowest position shown, for example, in FIGS. 1, 3, and 5 to minimize nominal height 82 and cause the seat shell entry points of shoulder belts 28, 30 to be lowered. In this position, it is contemplated that harness 26 will be used to restrain a young, small-sized child seated in child-restraint seat 10 as shown in FIG. 3. Child-restraint seat 10 can also be adjusted to assume other positions shown in FIGS. 10 and 12 to accommodate somewhat older, larger children in child-restraint seat 10 by raising harness-control panel 54 upwardly in direction 98 relative to back support portion 20 of seat shell 12 to increase nominal height 82 and cause the seat shell entry point of shoulder belts 28, to be raised.

Figure 14:
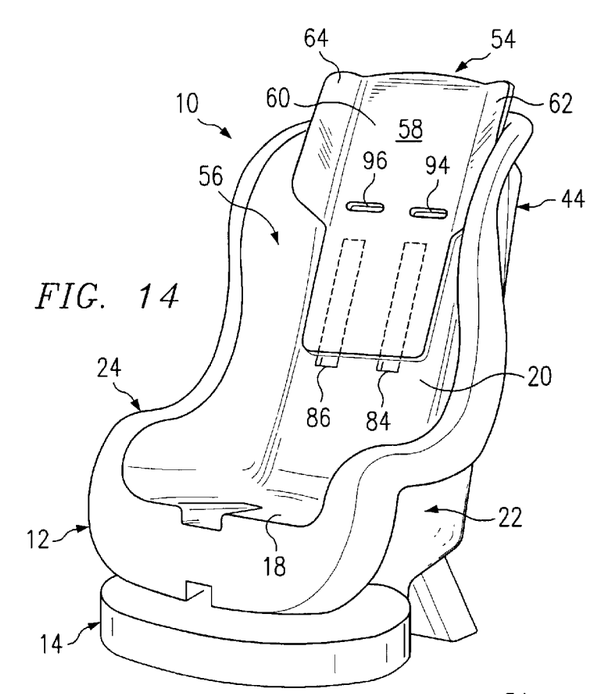
FIG. 14 is a front perspective view of the seat of FIG. 1 showing the harness-control panel fixed in a fourth position relative to the seat shell to position a headrest appended to the harness-control panel at a highest elevation above the bottom seat portion of the seat shell and showing that no child-restraint harness is coupled to the seat because, in this position, the seat is adapted to be used with an existing adult seat belt restraint system provided in a vehicle in which the seat is used to support a child.
Figure 15:
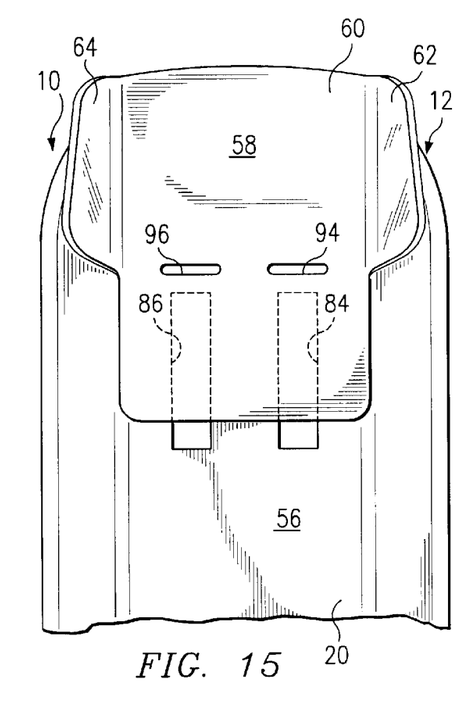
FIG. 15 is a front elevation view similar to FIGS. 5, 10, and 12 of the seat of FIG. 14 showing the harness-control panel in the fourth position and showing that the two belt-receiving apertures formed in the harness-control panel are spaced apart from the two belt-receiving apertures (shown in phantom) formed in the seat shell.
Figure 16:
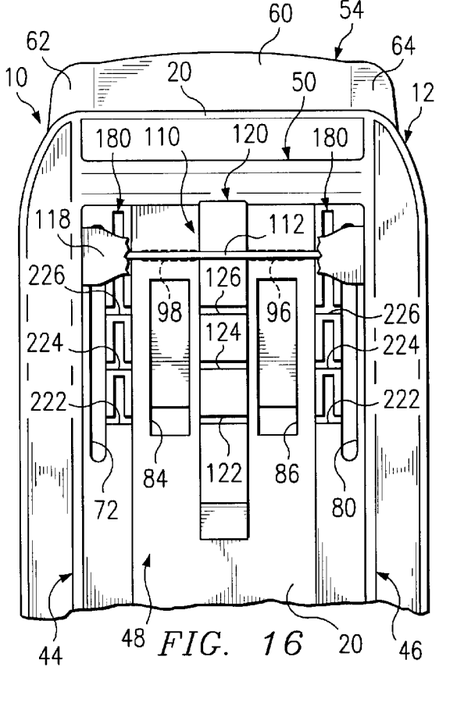
FIG. 16 is a rear elevation view similar to FIGS. 6, 11, and 13 showing the upper portion of the seat shown in FIGS. 14 and 15 wherein the horizontal belt support bar engages a fourth slot formed in the vertical bar anchor member.

Child-restraint seat 10 can also be adjusted to accommodate even older, larger-sized children by moving harness-control panel 54 to its highest position shown, for example, in FIGS. 14–16. In this position, it is contemplated that harness 26 will be removed from child-restraint seat 10 (or tucked in an out-of-the-way, unused position) and that an adult three-point vehicle lap/shoulder belt (not shown) will be used to restrain a child seated in child-restraint seat 10. In its highest position, harness-control panel 54 is used primarily to support headrest 60 in a proper elevated position relative to bottom seat portion 18. Harness-control panel 54 is not used to control the seat shell entry points of shoulder belts 28, 30 since those belts are not used to restrain a child in child-restraint seat 10 in such a configuration. As such, belt-receiving slot 94 does not communicate with first channel 84 and belt-receiving slot 96 does not communicate with second channel 86 when harness-control panel 54 and its headrest 60 is positioned in its highest position as shown, for example, in FIGS. 14–16.

Figure 4A:
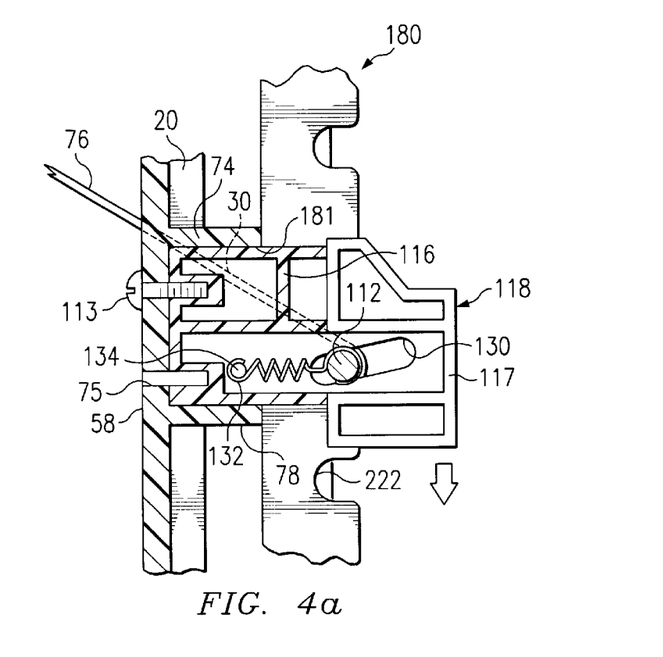
FIG. 4a is a sectional view taken along line 4a—4a of FIG. 4 showing the handle bar of the panel-height adjustment mechanism and a first arm of the handle bar received within a cavity formed by a post of the harness-control panel and coupled to the harness-control panel by a screw so that the harness-control panel and handle bar move together in a generally vertical direction when the horizontal belt support bar is removed from one of the position locator slots.
Figure 5:
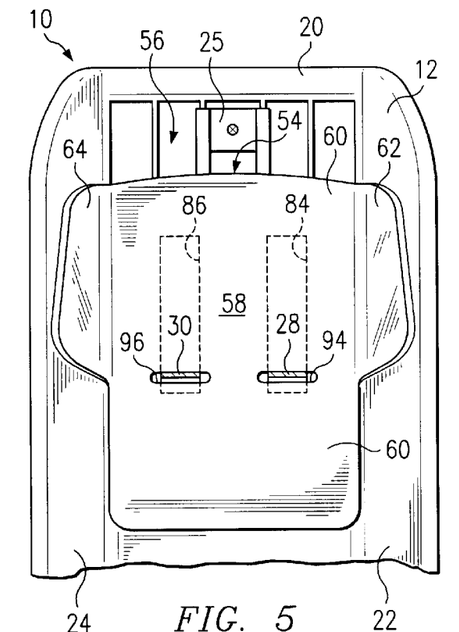
FIG. 5 is a front elevation view of an upper portion of the seat of FIGS. 1–4 showing the harness-control panel in a lowest position relative to the seat shell.
Figure 6:
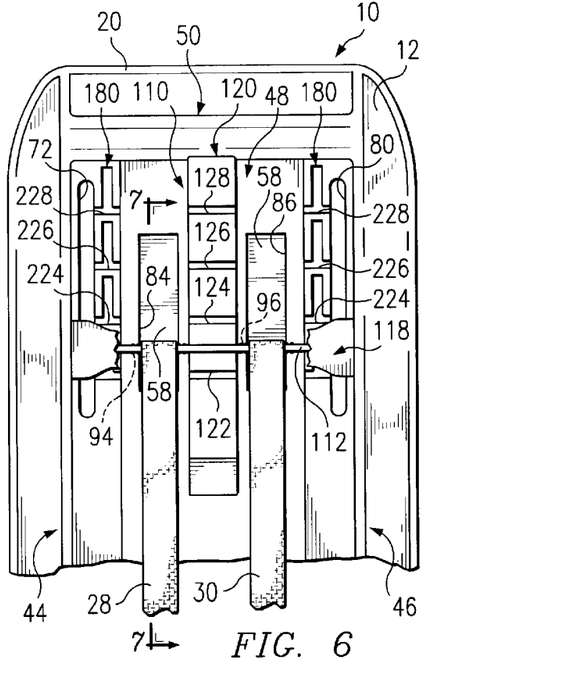
FIG. 6 is a rear elevation view of the upper portion of the seat shown in FIG. 5 showing the two shoulder belts, the horizontal belt support bar, the handle bar (shown with portions broken away), and the slotted vertical center and outer support bar anchor members positioned to engage a middle portion and opposite outer portions, respectively, of the hrizontal belt support bar.

Seat 10 further includes panel-height adjustment mechanism 110, as mentioned before, which operates to control the height of harness-control panel 54 relative to bottom seat portion 18. Panel-height adjustment mechanism 110 includes handle bar 118, belt support bar 112 coupled to handle bar 118, and a pair of springs 132 each coupled to both handle bar 118 and belt support bar 112. Handle bar 118 includes a first arm 114 received within cavity 75 of first support arm 66 of harness-control panel 54 and a second arm 116 received within cavity 75 of second support arm 74 of harness-control panel 54 for movement therewith, as shown in FIG. 4. Each arm 114, 116 is coupled to harness-control panel 54 by a screw 113, as shown in FIG. 4a. Handle bar 118 further includes a grip member 117 coupled to and positioned to extend between first arm 114 and second arm 116.

First arm 114 of handle bar 118 passes through a first vertical guide slot 72 formed in back support portion 20 of seat shell 12 and second arm 116 passes through a second vertical guide slot 80 also formed in back support portion 20 of seat shell 12. Guide slots 72, 80 are formed in back support portion 20 of seat shell 12 and are positioned to lie in spaced-apart parallel relation to one another. First arm 114, coupled to support arm 66 of harness-control panel 54, reciprocates in first guide slot 72 and second arm 116, coupled to support arm 74 of harness-control panel 54, reciprocates in second guide slot 80 as harness-control panel 54 moves up and down relative to back support portion 20 between a lowest position (shown, for example, in FIGS. 1, 3, and 5) adapted to suit a young, small-sized child and a highest position (shown, for example, in FIGS. 14–16) adapted to suit an older, larger-sized child.

Each of the first and second arms 114, 116 of handle bar 118 is formed to define a guide channel 130 as shown in FIGS. 4 and 4a. Belt support bar 112 is received within each guide channel 130 so that belt support bar 112 is coupled to and positioned to extend between first and second arms 114, 116 of handle bar 118. Further, belt support bar 112 is slidably movable within guide channels 130 relative to handle bar 118 in a generally horizontal direction.

As shown in FIG. 4a, each of the first and second arms 114, 116 is also formed to include a spring mount 134 for receiving one end of a tension spring 132.

Each tension spring 132 is coupled to and positioned to extend between each respective spring mount 134 and belt support bar 112. Tension springs 132 function to normally bias belt support bar 112 in a locked position in engagement with seat shell 12 as shown in FIGS. 4 and 4a. While FIG. 4 and 4a show the springs to be tension springs, one could use compression springs located between support bar 112 and grip member 117 of the handle bar 118.

Figure 2A:
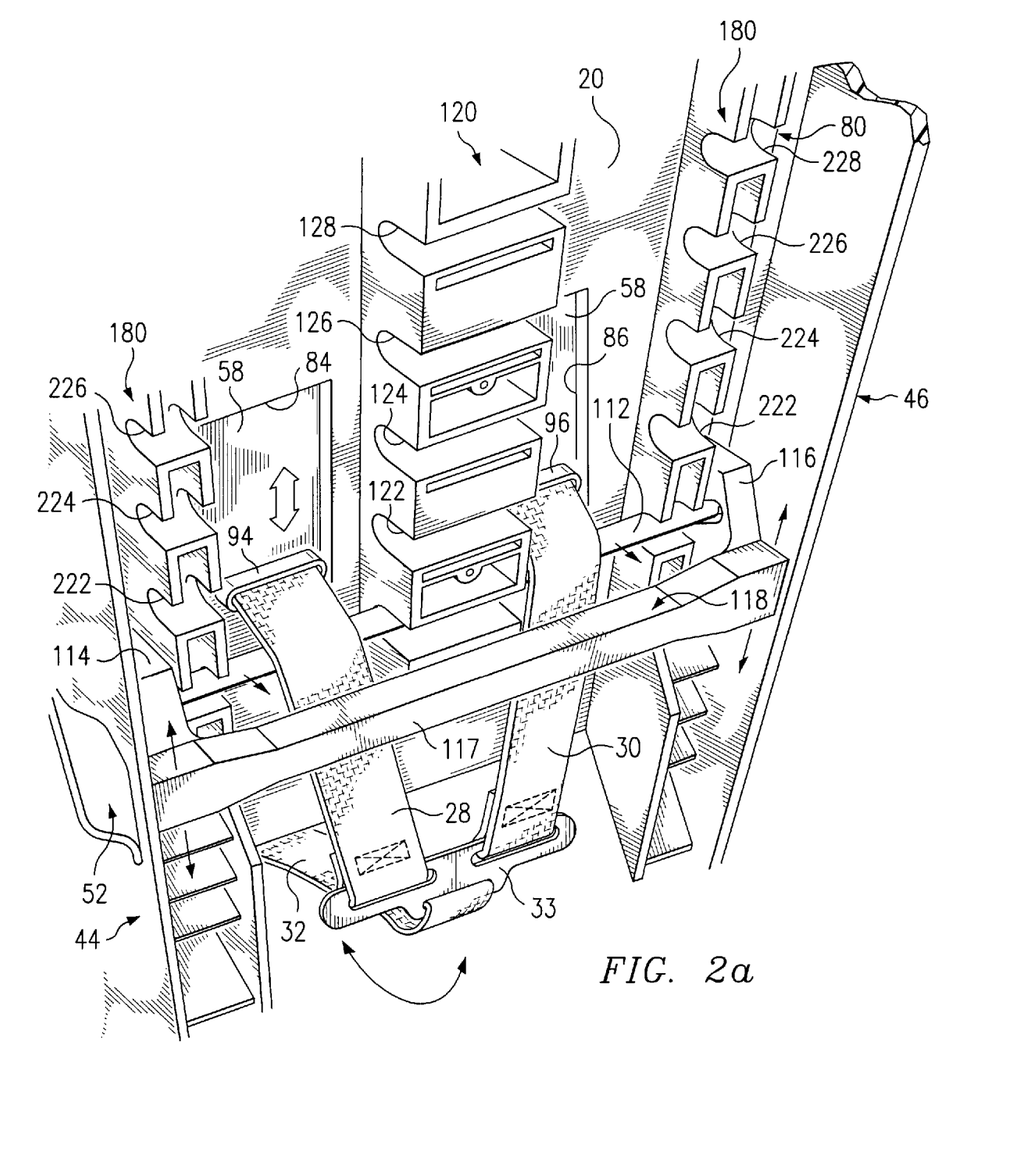
FIG. 2a is an enlarged rear perspective view of the seat of FIGS. 1 and 2 showing the center vertical support bar anchor member, two outer vertical support bar anchor members, and the horizontal belt support bar positioned to lie within a position locator slot of the center and outer vertical support bar anchor members and also showing the handle bar of the panel-height adjustment mechanism formed to include a first arm, a second arm, and a grip member coupled to the first and second arms and positioned to align with the horizontal belt support bar for generally vertical movement with the belt support bar relative to the center and outer vertical support bar anchor members.
Figure 9:
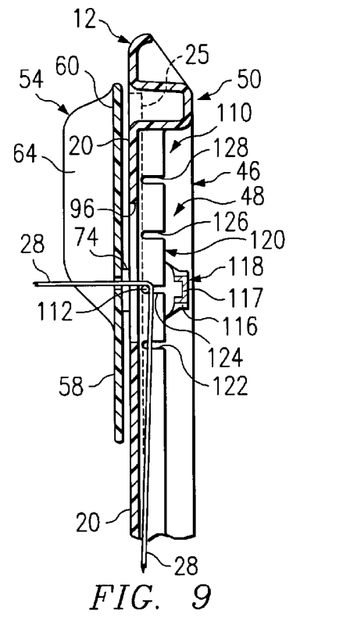
FIG. 9 is a sectional view similar to FIGS. 7 and 8 showing engagement of the horizontal belt support bar in the second slot to establish a fixed raised position of the harness-control panel relative to the seat shell above the lowest position shown in FIGS. 1–7 and showing the shoulder belts passing though the seat shell when the harness-control panel occupies its second position at a point that is higher than the seat shell entry point of the shoulder belts when the harness-control panel occupies its lowest position.
Figure 10:
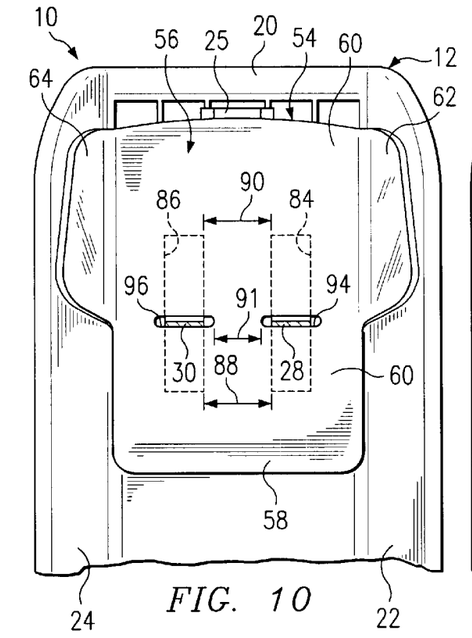
FIG. 10 is a front elevation view similar to FIG. 5 showing the harness control panel in its second position (corresponding to the position shown in FIG. 9)
Figure 11:
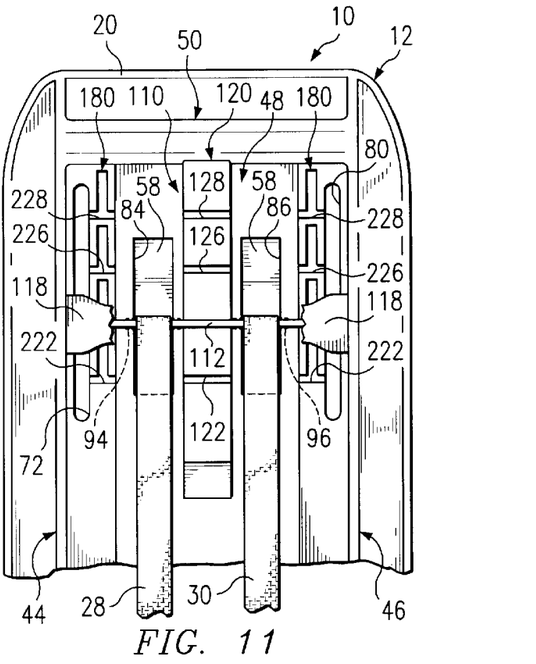
FIG. 11 is a rear elevation view similar to FIG. 6 showing the upper portion of the seat shown in FIG. 10 wherein the horizontal belt support bar engages the second slot formed in the vertical support bar anchor member.
Figure 12:
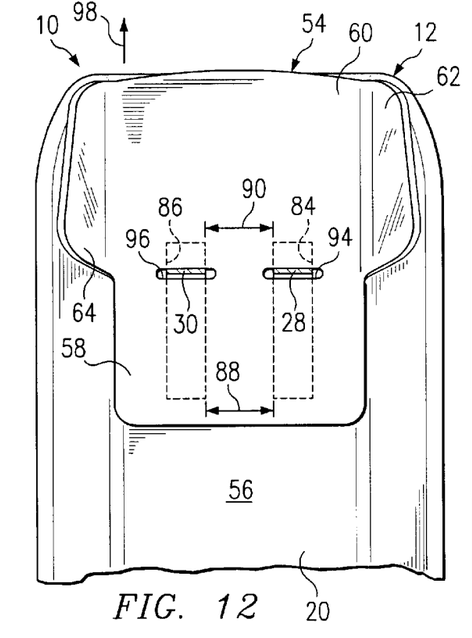
FIG. 12 is a front elevation view similar to FIGS. 5 and 10 showing the harness-control panel in a third position raised above the second position shown in FIG. 10.
Figure 13:
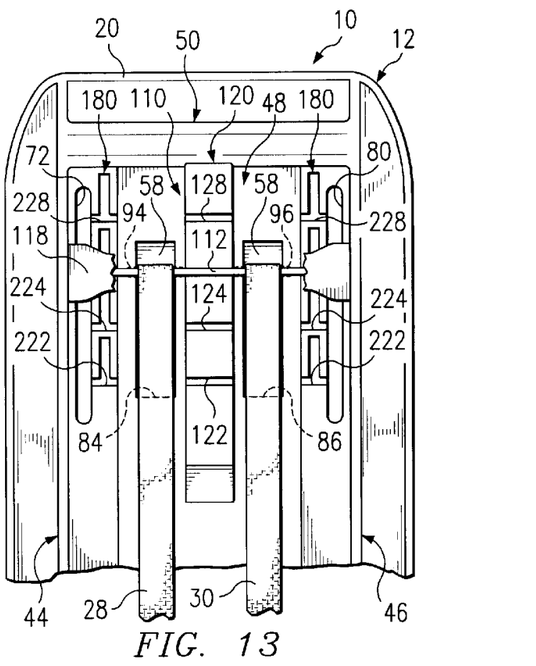
FIG. 13 is a rear elevation view similar to FIGS. 6 and 11 showing the upper portion of the seat shown in FIG. 12 wherein the horizontal belt support bar engages a third slot-formed in the vertical support bar anchor member.

Seat shell 12 further includes a center vertical bar anchor member 120 coupled to a rear side of back support portion 20 to lie in space 48 midway between first and second vertical back ribs 44, 46. An upper end of vertical bar anchor member 120 is coupled to a mid-portion of horizontal back rib 50, as shown in FIGS. 2 and 2a. Vertical bar anchor member 120 is formed to include a plurality of panel height locators such as vertically spaced-apart slots (e.g. slots 122, 124, 126, and 128), for receiving belt support bar 112 therein to establish a fixed position of first and second support arms 66, 74 (and harness-control panel 54 coupled to those support arms 66, 74) relative to the underlying bottom seat portion 18 of seat shell 12. Belt support bar 112 is received within one of the slots, 122, 124, 126, or 128 when in the locked position. Slot 122 is located to define a "lowest" position of harness-control panel 54 as shown in FIGS. 1–7. Slot 124 is located to define a "middle" position of harness-control panel 54 as shown in FIGS. 9–11. Slot 126 is located to define a "high" position of harness-control panel 54 as shown in FIGS. 12 and 13. Slot 128 is located to define a "highest" position of harness-control panel 54, as shown in FIGS. 14–16, wherein an older, larger sized child is restrained in child-restraint seat 10 using an adult vehicle shoulder and lap belt assembly rather than using child-restraint harness 26 provided in child-restraint seat 10.

A pair of outer vertical bar anchor members 180 are also coupled to the rear side of back support portion 20 to lie in space 48 in spaced-apart relation to each other so that center vertical bar anchor member 120 is positioned to lie between the outer vertical bar anchor members 180. Similar to center vertical bar anchor member 120, an upper end of each outer vertical bar anchor member 180 is coupled to an outer portion of horizontal back rib 50. Each vertical bar anchor member 180 further includes a plurality of panel height locators such as vertically spaced-apart slots (e.g. slots 222, 224, 226 and 228) for receiving belt support bar 112 therein. The vertically spaced-apart slots 222, 224, 226, and 228 of each outer vertical bar anchor member 80 correspond to the vertically spaced-apart slots 122, 124, 126, and 128 of the center vertical bar anchor member 120.

As mentioned above, each of the first and second arms 114, 116 of handle bar 118 is formed to include guide channel 130 for receiving one end (or a portion) of belt support bar 112 therein and supporting belt support bar 112 for back-and-forth sliding movement as belt support bar 112 is moved into and out of any of the slots 122, 124, 126, and 128 formed in center vertical bar anchor member 120 and slots 222, 224, 226, and 228 of both outer vertical bar anchor members 180 during movement of harness-control panel 54 relative to seat shell 12. Springs 132 are arranged to urge belt support bar 112 in a direction toward back support portion 20 to cause belt support bar 112 to be retained in one of the slots 122, 124, 126, 128 formed in center vertical bar anchor member 120 upon movement of belt support bar 112 into such a slot.

Figure 7:
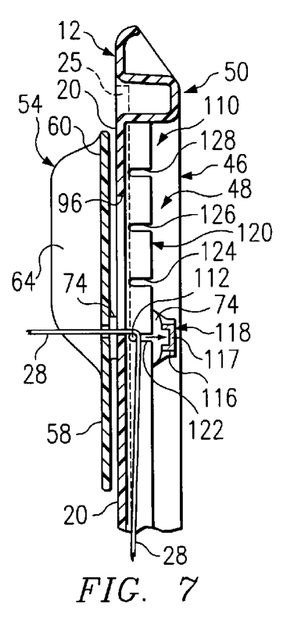
FIG. 7 is a sectional view taken along line 7—7 of FIG. 6 showing the horizontal belt support bar retained in the first slot formed in the center vertical bar anchor member by the handle bar.
Figure 8:
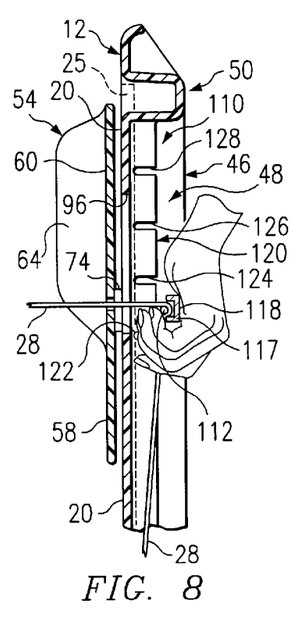
FIG. 8 is a sectional view similar to FIG. 7 showing upward movement of the harness-control panel relative to the seat shell after a user has pulled the horizontal belt support bar to the right toward the handle bar to release the horizontal belt support bar from the first slot in order to raise the handle bar and the horizontal belt support bar together, thus raising the harness-control panel.

Handle bar 118, as mentioned before, includes first arm 114 coupled to first support arm 66 of harness-control panel 54, second arm 116 coupled to second support arm 74 of harness-control panel 54, and grip member 117 interconnecting first arm 114 and second arm 116. Because handle bar 118 is rigidly coupled to harness-control panel 54, handle bar 118 is urged to move generally vertically with harness-control panel 54 relative to seat shell 12. Handle bar 118 is provided as a support so that a user can grip belt support bar 112 and grip member 117 of handle bar 118 to move belt support bar 112 relative to bar anchor members 120, 180 toward grip member 117 against the bias of springs 132 to release belt support bar 112 from slot 122, for example, as shown in FIGS. 7–9.

Once belt support bar 112 is released from engagement with slot 122, panel-height adjustment mechanism 110 with harness-control panel 54 is movable up or down to engage one of the other slots 124, 126, or 128 formed in center bar anchor member 120. As shown in the drawings, shoulder belts 28, 30 are positioned to wrap around belt support member 112 and lie on opposite sides of center vertical bar anchor member 120 so that any raising or lowering of belt support member 112 relative to center and outer vertical bar anchor members 120, 180 will change the nominal height 82 (and seat shell entry point) of the first and second shoulder belts 28, 30. FIGS. 7–9, for example, illustrate the movement of panel-height adjustment mechanism 110 from the first lowest position wherein belt support bar 112 is received within slot 122 to the second middle position wherein belt support bar 112 is received within slot 124.

Although this invention has been described in detail with reference to certain embodiments, variations and modifications exist within the scope and spirit of the invention as described and defined in the following claims.

What is claimed is:

1. A child-restraint seat comprising
   a seat shell including a bottom seat portion and a back support portion, the seat shell being adapted to be coupled to a vehicle seat by a seat anchor coupled to the vehicle,
   a child-restraint harness coupled to the seat shell,
   a harness-control panel formed to include a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion to harness small-sized children and large-sized children in a restrained position in the seat shell, the harness-control panel being positioned to lie adjacent to a front surface of the back support portion to cause a child seated in the seat shell to rest against the harness-control panel, and
   a panel height adjustment mechanism coupled to the harness control panel and formed to include a handle bar having a first arm coupled to the harness control panel and a second arm spaced-apart from the first arm and coupled to the harness-control panel, the panel height adjustment mechanism being further formed to include a belt support bar movably coupled to the first and second arms of the handle bar to engage and disengage a panel height locator on the seat shell to secure the harness-control panel at a desired height.

2. The child-restraint seat of claim 1, wherein the harness-control panel includes a back plate having a front side and a back side positioned to lie adjacent to the seat shell and the harness-control panel further includes two posts coupled to the back plate and each post is formed to define a cavity for receiving one of the first and second arms of the handle bar therein.

3. The child-restraint seat of claim 2, wherein the back support portion of the seat shell is formed to include two guide slots arranged in spaced-apart relation to each other and each guide slot is formed to receive one arm of the handle bar therethrough.

4. The child-restraint seat of claim 1, wherein the panel-height adjustment mechanism includes spring means coupled between the belt support and handle bars to bias the belt support bar into engagement with the panel height locator.

5. The child-restraint seat of claim 4, wherein the first arm of the handle bar is formed to include a spring mount and the second arm of the handle bar is also formed to include a spring mount so that a first spring of the spring means is coupled to the spring mount of the first arm at a first end and the belt support bar at a second end and a second spring of the spring means is coupled to the spring mount of the second arm at a first end and the belt support bar at a second end and the belt support bar at another end and further wherein the belt support bar moves relative to the handle bar in a generally horizontal direction.

6. The child-restraint seat of claim 4, wherein there are two panel height locators spaced apart from one another which engage spaced apart portions of the support bar to secure the harness-control panel at a desired height.

7. The child-restraint seat of claim 4, wherein there are three panel height locators spaced apart from one another which engage spaced apart portions of the support bar to secure the harness-control panel at a desired height.

8. The child-restraint seat of claim 4, wherein the spring means includes tension springs connected to the belt support bar and the handle bar.

9. The child-restraint seat of claim 1, wherein there are two panel height locators spaced apart from one another which engage spaced apart portions of the support bar to secure the harness-control panel at a desired height.

10. The child-restraint seat of claim 1, wherein there are three panel height locators spaced apart from one another which engage spaced apart portions of the support bar to secure the harness-control panel at a desired height.

11. The child-restraint seat of claim 1, wherein the harness-control panel includes a back plate formed to include first and second spaced-apart slots defining the belt-receiving opening, the shoulder belt portion of the child-restraint harness includes first and second shoulder belts, the back support portion of the seat shell is positioned to lie at an angle to the bottom seat portion and formed to include first and second channels aligned in spaced-apart relation to lie behind the back plate so that the first shoulder belt passes through the first slot and first channel and the second shoulder belt passes through the second slot and second channel during up and down movement of the harness-control panel relative to the seat shell.

12. The child-restraint seat of claim 11, wherein the back support portion is formed to include two guide slots arranged in spaced-apart relation to position the first and second channels therebetween, the harness-control panel further includes two posts coupled to the back plate, and the first and second arms are each arranged to extend through one of the guide slots and couple with one of the two posts.

13. The child-restraint seat of claim 12, wherein the back support portion includes a front surface facing toward the harness-control panel and a rear surface facing away from the harness-control panel, each guide slot defines an aperture extending through the back support portion and having an opening in each of the front and rear surfaces of the back support portion, and each arm of the handle bar passes through one of the openings in the rear surface of the back support portion and one of the openings in the front surface of the back support portion.

14. The child-restraint seat of claim 11, wherein the harness-control panel further includes a headrest provided in an upper portion of the back plate above the first and second spaced-apart slots and adapted to extend above an upper edge of the back support portion upon removal of the first and second shoulder belts from the first and second spaced-apart slots and the first and second channels and movement of the harness-control panel to a highest position relative to the seat shell.

15. The child-restraint seat of claim 14, wherein the first and second spaced-apart slots are located in spaced-apart relation to the first and second channels upon movement of the harness-control panel to the highest position relative to the seat shell.

16. The child-restraint seat of claim 1, further comprising first and second springs each coupled to the belt support bar and one of the arms of the handle bar respectively, and wherein the belt support bar is mounted for generally horizontal movement between a first position and a second position relative to the back support portion to engage and disengage the panel height locators such that the second position is a greater distance spaced-apart from the harness-control panel than the first position so that when the belt support bar is in the second position and the harness-control panel is movable up and down relative to the seat shell.

17. The child-restraint seat of claim 1, wherein the back support portion of the seat shell is positioned to lie at an angle to the bottom seat portion and is formed to include a first and second guide slot extending therethrough and the harness-control panel includes a back plate formed to include the belt-receiving opening and arranged to lie adjacent to a front surface of the seat shell to cause a child seated in the seat shell to rest against the back plate, wherein the harness-control panel further includes a first post and a second post each coupled to the back plate and each formed to include a cavity for receiving each of the first and second arms of the handle bar therein, and wherein the first and second arms are arranged to extend through the first and second guide slots, respectively, to reciprocate up and down therein as the back plate moves up and down relative to the back support portion between a low position adapted to suit a small-sized child and a higher position adapted to suit a larger-sized child.

18. The child-restraint seat of claim 17, wherein the back support portion is formed to include two spaced-apart guide slots extending therethrough and the harness-control panel includes two posts coupled to the back plate and the first and second arms are each coupled to a respective post and arranged to extend through one of the guide slots.

19. The child-restraint seat of claim 18, wherein each post is formed to define a cavity and the first and second arms of the handle bar are each formed to be received within the cavity of the respective post.

20. The child-restraint seat of claim 17, wherein the harness-control panel includes first and second wing members coupled to opposite edges of the back plate and positioned to lie in spaced-apart relation to one another and the first post is coupled to the first wing member and the second post is coupled to the second wing member.

21. The child-restraint seat of claim 17, wherein the seat shell further includes two vertical back ribs appended to a back surface of the back support portion and wherein each vertical back rib is formed to include one guide slot.

22. The child-restraint apparatus of claim 1, wherein the back support portion is positioned to lie at an angle to the bottom seat portion and the panel height locator is coupled to the back support portion for allowing movement of the harness-control panel up and down relative to the bottom seat portion.

23. The child-restraint apparatus of claim 22, wherein the panel height locator is provided with slots at different elevations above the bottom seat portion and wherein the belt support bar engages a selected one of the panel height locator slots to establish a selected elevation of the harness-control panel and the shoulder belt portions of the child-restraint harness received in the belt-receiving opening formed in the harness-control panel above the bottom seat portion.

24. The child-restraint seat of claim 23, wherein a first and second spring are provided to urge the belt support bar into one of the panel height locator slots and are further formed to extend during movement of the belt support bar in a direction generally away from the seat back to disengage the belt support bar from the panel height locator slots.

25. The child-restraint apparatus of claim 23, wherein the seat shell further includes a vertical bar anchor member coupled to the back support portion of the seat shell and formed to include the panel height locator slots.

26. The child-restraint apparatus of claim 1, wherein the handle bar and harness-control panel are movable in a generally vertical direction when the belt support bar is in unengaged.

27. A child-restraint seat comprising
a seat shell including a bottom seat portion,
a child-restraint harness coupled to the seat shell, and
a harness-control panel formed to include a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion to harness small-sized children and large-sized children in a restrained position in the seat shell,
the seat shell further including a back support portion positioned to lie at an angle to the bottom seat portion,
panel height locators coupled to the back support portion at different elevations above the bottom seat portion,
a support bar coupled to the harness-control panel to engage a selected one of the panel height locators to establish a selected elevation of the harness-control panel and the shoulder belt portions of the child-restraint harness received in the belt-receiving opening formed in the harness-control panel above the bottom seat portion,
the back support portion formed to include an opening therein,
the harness-control panel includes a back plate formed to include the belt-receiving opening, and
a post coupled to both the back plate and a support for the support bar, the post extending in a direction generally toward the seat back, and wherein the support is arranged to extend through the opening formed in the back support portion to be received within a cavity of the post.

28. The child-restraint apparatus of claim 27, wherein the back support portion includes a front side facing toward a child seated in the seat shell and an opposite rear side, on which the panel height locator is mounted and the panel height locator is formed to include a plurality of vertically spaced-apart slots configured to receive a portion of the support bar therein.

29. The child-restraint apparatus of claim 28, wherein the back support portions includes another opening and the panel height locator is positioned to lie between the opening of the back support portion.

30. The child-restraint seat of claim 28, further comprising a spring urging the support bar into one of the spaced apart slots between a first position engaged with one of the spaced apart slots and a second position disengaged from the spaced apart slots.

31. The child-restraint seat of claim 30, wherein the spring is formed to move the support bar in a generally horizontal direction relative to the harness-control panel.

32. The child-restraint apparatus of claim 27, wherein the child-restraint apparatus is further formed to include a panel-height adjustment mechanism defining engagement means and being coupled to the post of the harness-control panel and formed to include a handle bar coupled to the support bar and a spring coupled to the support bar and the handle bar and positioned to bias the support bar into engagement with the vertically spaced-apart slots of an anchor member coupled to the back support portion and formed to include at least two paned height locators.

33. The child-restraint apparatus of claim 32, wherein the handle bar of the panel-height adjustment mechanism includes a first arm, a second arm in spaced-apart relation to the first arm, and a grip member coupled to an positioned to lie between the first and second arm and further wherein each arm includes a spring mount and the panel-height adjustment mechanism includes another spring such that each spring is coupled at a first end to the spring mount of one of the first and second arms and is coupled at a second to the support bar.

34. A child-restraint seat comprising
a seat back formed to include first and second vertical guide slots positioned to lie in spaced-apart relation to each other and first and second channels positioned to lie between the first and second vertical guide slots and aligned in spaced-apart relation,
a harness-control panel including a back plate formed to include a first slot communicating with the first channel and a second slot communicating with the second channel,
a child-restraint harness including a first shoulder belt passing through the first slot and first channel and a second shoulder belt passing through the second slot and second channel, and
means for moving the harness-control panel up and down relative to the seat back to move the first and second shoulder belts passing through the first and second slots in the first and second channels. up and down relative to the seat back to accommodate small-sized and large-sized children, the seat back being positioned to lie between the harness-control panel and the moving means, the moving means including a panel-height adjustment mechanism coupled to the harness-control panel and formed to include a handle bar coupled to the harness-control panel and formed to extend through the first and second vertical guide slots of the seat back, a belt support bar movably coupled to the handle bar and formed to engage each of the first and second shoulder belts of the child-restraint harness, and a first and second spring each coupled to the belt support bar and the handle bar and positioned to bias the belt support bar in a direction generally toward the seat back.

35. The child-restraint seat of claim 34, wherein the belt support bar is arranged to lie behind the seat back to locate the seat back between the harness-control panel and the belt support bar and the first and second shoulder belts exit the first and second channels to engage the belt support bar.

36. The child-restraint seat of claim 35, wherein the seat back is formed to include a guide slot, the harness-control panel further includes a post coupled to the back plate and the handle bar to move with the belt support bar and the handle bar in a generally vertical direction relative to the seat back, and wherein the handle bar is arranged to pass through the guide slot formed in the seat back.

37. The child-restraint seat of claim 34, wherein the harness-control panel further includes a headrest provided in an upper portion of the back plate above the first and second spaced-apart slots and adapted to extend above an upper edge of the seat back upon removal of the first and second shoulder belts from the first and second spaced-apart slots and the first and second channels and movement of the harness-control panel to a highest position relative to the seat shell.

38. The child-restraint seat of claim 37, wherein the first and second spaced-apart slots are located in a position below the headrest to lie in spaced-apart relation to the first and second channels upon movement of the harness-control panel to the highest position relative to the seat shell.

39. A child-restraint seat comprising
a seat back formed to include first and second channels aligned in spaced-apart relation,
a harness-control panel including a back plate formed to include a first slot communicating with the first channel and a second slot communicating with the second channel,
a child-restraint harness including a first shoulder belt passing through the first slot and channel and a second shoulder belt passing through the second slot and channel, and
means for moving the harness-control panel up and down relative to the seat back to move the first and second shoulder belts passing through the first and second slots in the first and second channels up and down relative to the seat back to accommodate small-sized and large-sized children, the moving means being defined by a panel-height adjustment mechanism formed to include a belt support bar arranged to lie behind the seat back with the seat back located between the harness-control panel and the belt support bar and wherein the first and second shoulder belts exit the first and second channels to engage the belt support bar,
wherein the seat back further includes a guide slot and the panel-height adjustment mechanism further includes a handle bar coupled to the harness-control panel and formed to extend through the guide slot and at least one spring coupled to the handle bar and the belt support bar and arranged to urge the belt support bar into one of a plurality of position locator slots formed in the seat back upon movement of the belt support bar to lie in confronting relation therewith, and
wherein selective movement of the belt support bar against the at least one spring disengages the one of the position locator slots to enable a user to move the belt support bar up and down relative to the seat back, thereby moving the harness-control panel and the first and second shoulder belts up and down relative to the seat back.

40. A child-restraint seat comprising
a seat back formed to include first and second channels aligned in spaced-apart relation and formed to include a guide slot,
a harness-control panel including a back plate formed to include a first slot communicating with the first channel and a second slot communicating with the second channel, the -harness-control panel including a post appended to the back plate and extending in a direction generally toward the seat back,
a child-restraint harness including a first shoulder belt passing through the first slot and first channel and a second shoulder belt passing through the second slot and second channel,
an anchor member coupled to the seat back and formed to include at least two panel height locators, and
a panel-adjustment assembly coupled to the post of the harness-control panel and formed to include a handle bar coupled to the post and the handle bar positioned to extend through the guide slot of the seat back and a belt support bar movably coupled to the handle bar and formed to move relative to the handle bar between a first position engaging one of the at least two panel height locators to prevent the harness-control panel from moving relative to the seat back and a second position disengaged from the at least two panel height locators to allow the harness-control panel to move up and down relative to the seat back to move the first and second shoulder belts passing through the first and second slots and passing through the channels up and down relative to the seat back to accommodate small-sized and large-sized children.

41. The child-restraint seat of claim 40, wherein the guide slot is a first guide slot, the seat back includes a second guide slot, and the first and second channels are positioned to lie between the first and second guide slots.

42. The child-restraint seat of claim 41, wherein the anchor member is located on the seat back at a position between the first and second channels.

43. The child-restraint seat of claim 41, wherein the handle bar includes a first arm, a second arm spaced-apart from the first arm, and a grip member coupled to and positioned to lie between the first and second arms and further wherein the first arm extends through the first guide slot and the second arm extends through the second guide slot and the belt support bar extends between and is movably coupled to the first and second support arms.

44. The child-restraint seat of claim 43, wherein the belt support bar is biased with respect to the first and second support arms toward the anchor member.

45. The child-restraint seat of claim 40, wherein the anchor member is a vertical rib, the belt support member is a bar, and the vertical rib is formed to include at least two bar-receiving slots for receiving the belt-support member therein that define the at least two panel height locators.

46. The child-restraint seat of claim 45, wherein the first and second shoulder belts each include respective portions that engage the belt support member.

47. The child-restraint seat of claim 45, wherein the belt support member is biased with respect to the handle bar toward the vertical rib.

* * * * *